US012755734B2

(12) United States Patent
Fukuda et al.

(10) Patent No.: US 12,755,734 B2
(45) Date of Patent: Oct. 6, 2026

(54) INSERTION ERROR REDUCTION WITH CONFIDENCE SCORE-BASED WORD FILTERING

(71) Applicant: International Business Machines Corporation, Armonk, NY (US)

(72) Inventors: Takashi Fukuda, Tokyo (JP); George Andrei Saon, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 18/129,030

(22) Filed: Mar. 30, 2023

(65) Prior Publication Data

US 2024/0331687 A1 Oct. 3, 2024

(51) Int. Cl.
*G10L 15/22* (2006.01)
*G10L 15/19* (2013.01)

(52) U.S. Cl.
CPC .............. *G10L 15/19* (2013.01); *G10L 15/22* (2013.01)

(58) Field of Classification Search
USPC ................ 704/246, 247, 251, 252, 275, 231
See application file for complete search history.

(56) References Cited

U.S. PATENT DOCUMENTS 9,672,817 B2 * 6/2017 Yong ....................... G10L 15/14
11,158,307 B1 10/2021 Ghias
11,514,916 B2 11/2022 Kim
2002/0128836 A1 * 9/2002 Konuma ............... G10L 15/065 704/E15.009
2004/0215465 A1 * 10/2004 Lee ......................... G10L 15/26 707/E17.103
2013/0096918 A1 * 4/2013 Harada ................... G10L 15/19 704/E15.005
2014/0074475 A1 * 3/2014 Kitade .................... G10L 15/01 704/251
2015/0228273 A1 * 8/2015 Serban .................... G10L 15/02 704/254
2016/0253923 A1 * 9/2016 Wang ..................... G09B 19/06 434/157
2016/0336007 A1 * 11/2016 Hanazawa .......... G06F 16/3343
2018/0068653 A1 3/2018 Trawick
2020/0404386 A1 * 12/2020 Mccartney, Jr. ........ G06F 40/58
2021/0118446 A1 * 4/2021 Lee ......................... G10L 15/08

FOREIGN PATENT DOCUMENTS

EP 3711045 B1 9/2021

OTHER PUBLICATIONS

Samuel Thomas et al., Analyzing convolutional neural networks for speech activity detection in mismatched acoustic condition. 2014 IEEE International Conference on Acoustics, Speech and Signal Processing (ICASSP). May 4-9, 2014, pp. 5.

* cited by examiner

*Primary Examiner* — Leonard Saint-Cyr
(74) *Attorney, Agent, or Firm* — CHIP LAW GROUP

(57) ABSTRACT

A word-level confidence score is calculated using a computerized automatic speech recognition system by computing an average of confidence levels for each character in a word and a trailing space character delineating an end of the word and the word is managed using the computerized automatic speech recognition system and using a threshold process based on the calculated word-level confidence score.

14 Claims, 5 Drawing Sheets

| | | %Word error rate | | | | | |
|---|---|---|---|---|---|---|---|
| | | US | AU | GB | IN | Cust | DC |
| #1 | Baseline w/o confidence filtering | 33.9 | 17.8 | 26.9 | 22.8 | 34.3 | 37.9 |
| #2 | Word confidence filtering (w/o space) | 33.0 | 17.3 | 27.0 | 22.5 | 30.2 | 32.6 |
| #3 | Word conf. filtering (w/ space, default) | 32.7 | 17.5 | 26.5 | 22.2 | 29.1 | 32.1 |
| #4 | Weighted word conf (chars:0.8, <space>:1.2) | 32.7 | 17.3 | 26.4 | 22.0 | 28.4 | 31.9 |
| #5 | Word conf + 1st char conf | 32.8 | 17.1 | 26.3 | 22.1 | 29.1 | 32.1 |

*FIG. 4*

1. Exp. on confidence considering only the last character for the recombination

| | %Word error rate | | | | | |
|---|---|---|---|---|---|---|
| | US | AU | GB | IN | Cust | DC |
| Baseline w/o conf filtering | 33.9 | 17.8 | 26.9 | 22.8 | 34.3 | 37.9 |
| Remove words in conf < 0.4 | 33.7 | 17.5 | 26.7 | 22.7 | 33.6 | 36.8 |
| Remove words in conf < 0.5 | 33.3 | 17.3 | 26.5 | 22.4 | 31.5 | 34.9 |
| Remove words in conf < 0.6 | 32.9 | 17.8 | 26.9 | 22.4 | 29.4 | 32.5 |
| Remove words in conf < 0.7 | 34.2 | 19.4 | 29.3 | 24.1 | 28.6 | 32.6 |

*FIG. 5A*

2. Exp. on confidence including space character + recombination process considering all characters

| | US | AU | GB | IN | Cust | DC |
|---|---|---|---|---|---|---|
| Remove words in conf < 0.4 | 33.7 | 17.4 | 26.6 | 22.6 | 33.8 | 36.7 |
| Remove words in conf < 0.5 | 33.3 | 17.2 | 26.4 | 22.3 | 31.6 | 34.6 |
| Remove words in conf < 0.6 | 32.7 | 17.5 | 26.5 | 22.2 | 29.1 | 32.1 |
| Remove words in conf < 0.7 | 33.6 | 18.9 | 28.3 | 23.3 | 28.6 | 31.9 |

*FIG. 5B*

INSERTION ERROR REDUCTION WITH CONFIDENCE SCORE-BASED WORD FILTERING

BACKGROUND

The present invention relates generally to the electrical, electronic and computer arts and, more particularly, to computer-implemented speech recognition.

Insertion errors are well known as a problem for speech recognition systems in general. For example, noise-only signals are often erroneously recognized as certain words (referred to herein as the "insertion problem"). Automatic speech recognition (ASR) systems are often deployed together with voice activity detection (VAD) to run ASR only on the voice acoustic signals as a solution for the insertion problem. There is, however, an insufficient amount of realistic training data for VAD to improve the insertion problem.

BRIEF SUMMARY

Principles of the invention provide techniques for insertion error reduction with confidence score-based word filtering. In one aspect, an exemplary method includes the operations of calculating, using a computerized automatic speech recognition system, a word-level confidence score by computing an average of confidence levels for each character in a word and a trailing space character delineating an end of the word and managing, using the computerized automatic speech recognition system, the word using a threshold process based on the calculated word-level confidence score.

In one aspect, a non-transitory computer readable medium comprises computer executable instructions which when executed by a computer cause the computer to perform the method of calculating a word-level confidence score by computing an average of confidence levels for each character in a word and a trailing space character delineating an end of the word and managing the word using a threshold process based on the calculated word-level confidence score.

In one aspect, an apparatus comprises a memory and at least one processor, coupled to the memory, and operative to perform operations comprising calculating a word-level confidence score by computing an average of confidence levels for each character in a word and a trailing space character delineating an end of the word and managing the word using a threshold process based on the calculated word-level confidence score.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

- improves the technological process of computerized speech recognition by filtering decoded words at the decoding stage of noise-only segments (portions of speech signals containing noise) with a confidence score for RNN-T based ASR;
- improves the technological process of computerized speech recognition by calculating an average of confidence for each character in a corresponding word, including space characters that appear after the last character of the word, and removing uncertain words using a threshold process based on the calculated confidence score;
- improves readability of ASR results and improves subjective evaluation for ASR users by enhancing the word-filtering accuracy (insertion errors in ASR give a negative impression of ASR performance for ASR users because words appear in ASR results despite not speaking); and
- improves the technological process of computerized speech recognition by recombining/merging confidence scores for hypotheses of the same word.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 4 is a table showing the word error rate for different sets of mixed dialect data using a variety of techniques, in accordance with an example embodiment;

FIG. 5A is a table showing the word error rate for different sets of mixed dialect data using a variety of thresholds, in accordance with an example embodiment;

FIG. 5B is a table showing the word error rate for different sets of mixed dialect data using a variety of thresholds, in accordance with an example embodiment;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims.

That is, no limitations with respect to the embodiments shown and described herein are intended or should be inferred.

Generally, methods and systems to reduce insertion errors due to a failure to properly detect speech are disclosed. In one example embodiment, insertion errors are reduced by filtering decoded words at the decoding stage of noise-only segments (portions of signals containing noise) with a confidence score for, for example, RNN-T based ASR.

We have found that next generation Recurrent Neural Network Transducer (RNN-T) based speech recognition is sensitive to background additive noises. The additive noises are often mistakenly regarded as a speech signal.

Low Confidence Filtering for RNN-T Based ASR

Figure 1:
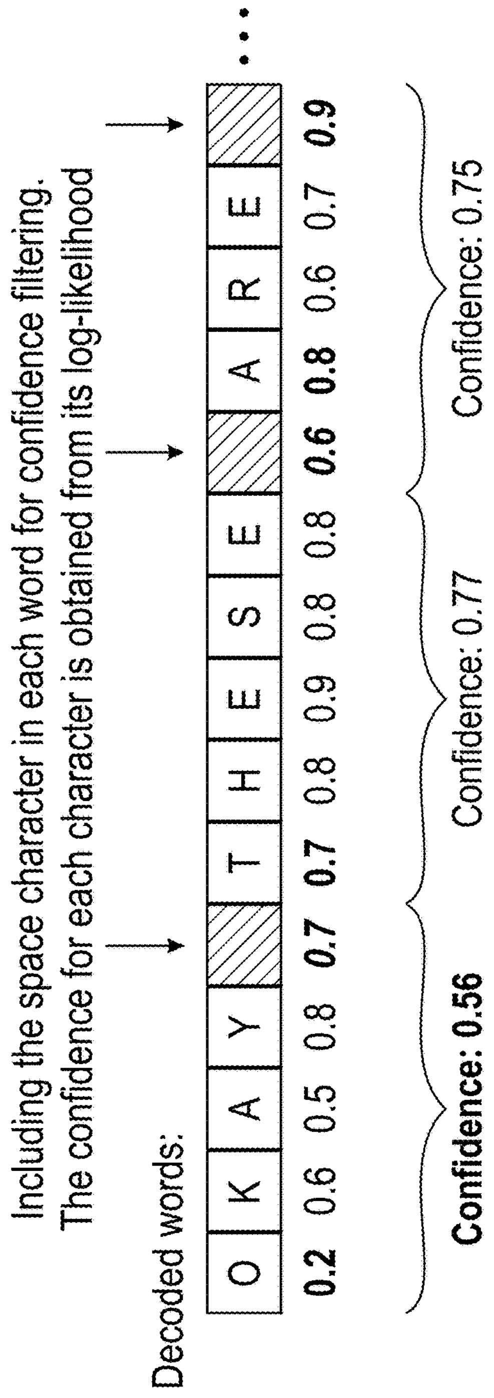
FIG. 1 is a representation of an example decoding of words using ASR, in accordance with an example embodiment.

In one example embodiment, uncertain words resulting from noise processed by a character-based neural transducer-based speech recognition system are filtered out. FIG. 1 is a representation of an example decoding of words using ASR, in accordance with an example embodiment. A word-level confidence score is calculated by taking the average of confidence for each character in a corresponding word, including space characters that appear after the last character of the word, and removing uncertain words using a threshold process based on the calculated confidence score. In one example embodiment, the confidence for each character is based on its log-likelihood. The skilled artisan will be familiar with the concepts of automatic speech recognition including use of acoustic models, language models, end-to-end neural network models, ASR decoder, and log-likelihood calculations. As illustrated in FIG. 1, the first word ("OKAY") and trailing space character have a confidence of 0.56, the second word ("THESE") and trailing space character have a confidence of 0.77, and the third word ("ARE") and trailing space character have a confidence of 0.75. In the example of FIG. 1, the confidence threshold is set to 0.7; thus, any word with a confidence level less than 0.7 is removed. In the example of FIG. 1, the word ("OKAY") and trailing space character are removed from the speech transcript since the confidence level is less than 0.7. In one or more embodiments, the threshold which provides the best accuracy can be determined by tests on a small amount of development data. Given the teachings herein, the skilled artisan will be able to readily determine an appropriate threshold using heuristics and/or tests for the particular domain of interest. In one example embodiment, the confidence of the first character for each word in isolation is also considered for the threshold process.

Weighted Sum of the Confidence

Figure 2:
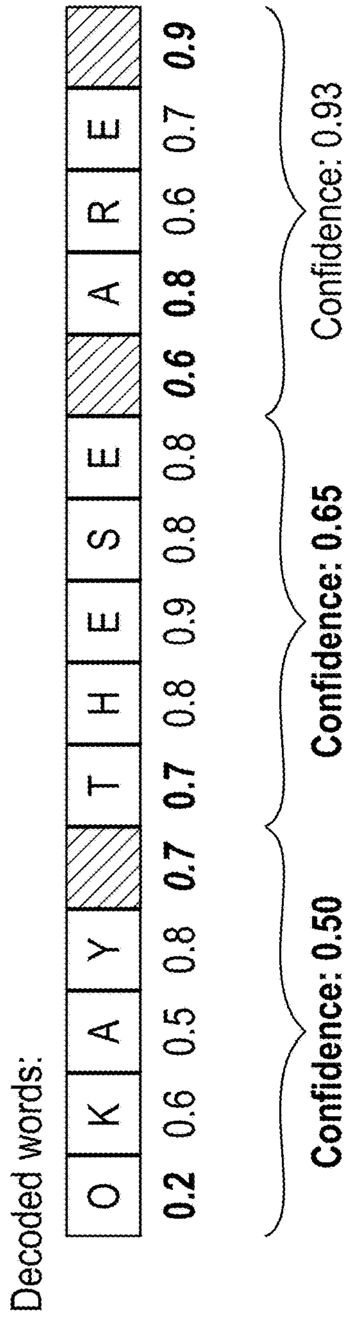
FIG. 2 is a representation of an example decoding of words using ASR with a weighted sum of the confidence level, in accordance with an example embodiment.

In one example embodiment, the word-level confidence score is calculated with a weighted sum of the confidence for the characters of the word and the trailing space character (to, for example, focus more on the space character). In one aspect, it is recognized that the space character is typically the most frequent character in the training data and that the estimation capability of the space character becomes a high-quality indicator compared to other characters, which helps to determine an accurate confidence score via the weighting process. Focus on the confidence of the space character trailing each word is advantageous because of its importance; thus, a higher weight is applied to the space character than the other characters. FIG. 2 is a representation of an example decoding of words using ASR with a weighted sum of the confidence level, in accordance with an example embodiment. For example, the weight for the space character may be set to 1.2 and the weight for the remaining characters may be set to 0.8. As illustrated in FIG. 2, using the example weights, the first word ("OKAY") and trailing space character have a confidence of 0.50, the second word ("THESE") and trailing space character have a confidence of 0.65, and the third word ("ARE") and trailing space character have a confidence of 0.93.

Leveraging the Confidence of the First Character

In one example embodiment, the confidence level of the entire word and the confidence level of the first character are jointly considered as the confidence of the first character has a unique property for a noise-only input signal. For example, the word can be deleted if the confidence level of the entire word is less than a first threshold $\alpha$ and the confidence level of the first character of the word is greater than a second threshold $\beta$.

Recombination of Confidence Scores for the Same Hypotheses

In one example embodiment, confidence scores for hypotheses (candidate words) of the same (repeated) word are recombined/merged for the performed confidence estimation at decoding time; that is, the same character sequence appearing in a beam (sequence of word hypotheses) during decoding is performed by taking the maximum score for each of the last k characters of the hypotheses (including the case where the last k characters includes all the characters of each hypothesis) in the beam. For the avoidance of doubt, in one or more embodiments, only the last k characters of each repeated word are considered, and "case" in the context of the previous sentence refers to an example of all the characters of repeated words are in addition to that of only the last k characters, not upper/lower case.

Figure 3:
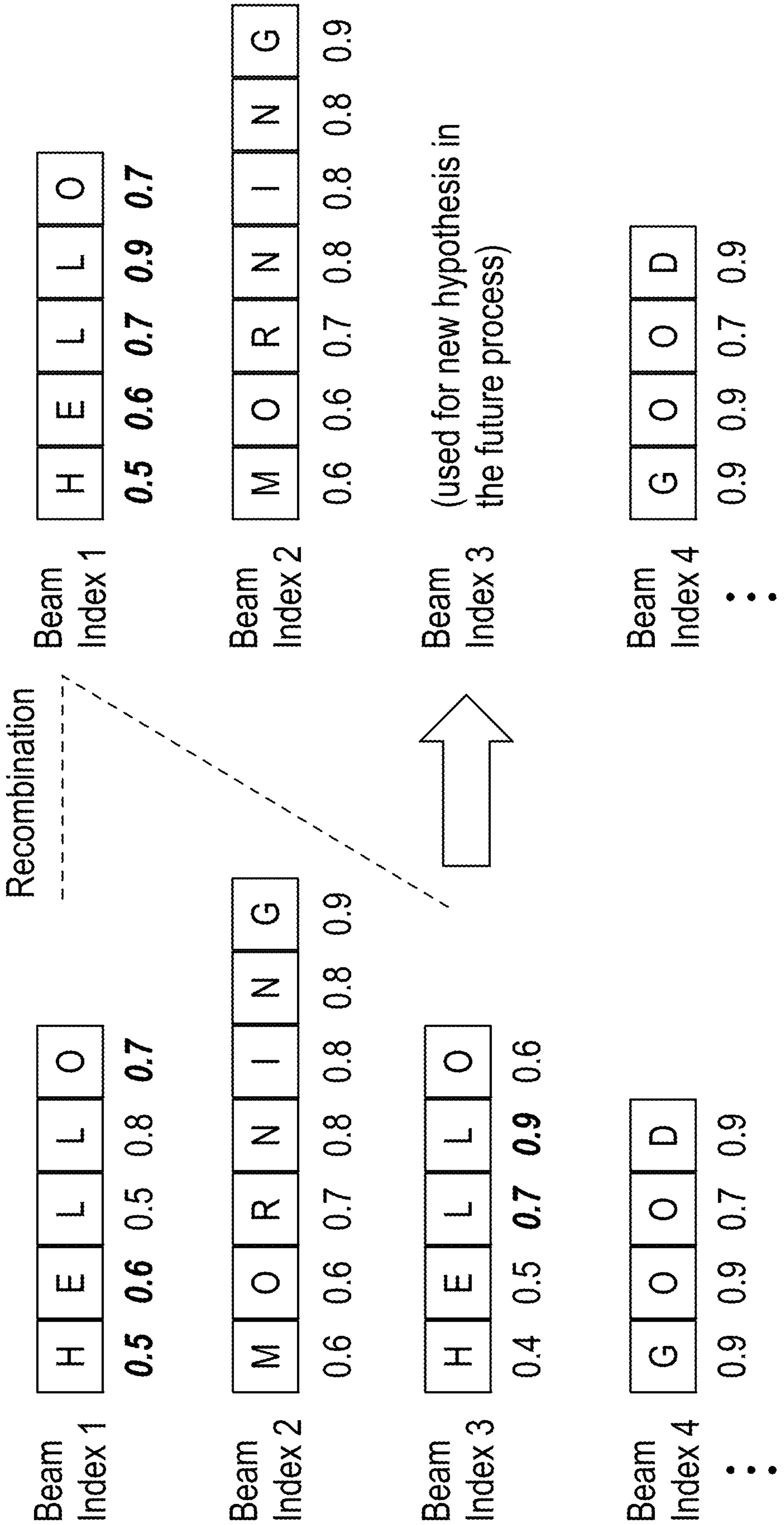
FIG. 3 is a representation of example decodings of words using ASR with a recombination of confidence scores, in accordance with an example embodiment.

FIG. 3 is a representation of example decodings of words using ASR with a recombination of confidence scores, in accordance with an example embodiment. During the beam search process, the same words sometimes appears at different positions of the beam. For example, as illustrated in FIG. 3, the word "HELLO" appears twice: at Beam Index 1 and Beam Index 3. The confidence level for each letter of the word "HELLO" varies between the two instances. In one example embodiment, the confidence level of the repeated words are merged into one hypothesis. The goal is to keep the higher confidence on a letter-by-letter basis. The confidence levels of a given letter are compared and the higher value is maintained (that is, take the maximum of the confidence of the same letter position and combine the varying confidence levels into one hypothesis with a new overall confidence level). As illustrated in FIG. 3, the combined confidence levels for the word "HELLO" are 0.5, 0.6, 0.7, 0.9, and 0.7 and are used for both instances of the word "HELLO."

Figure 6:
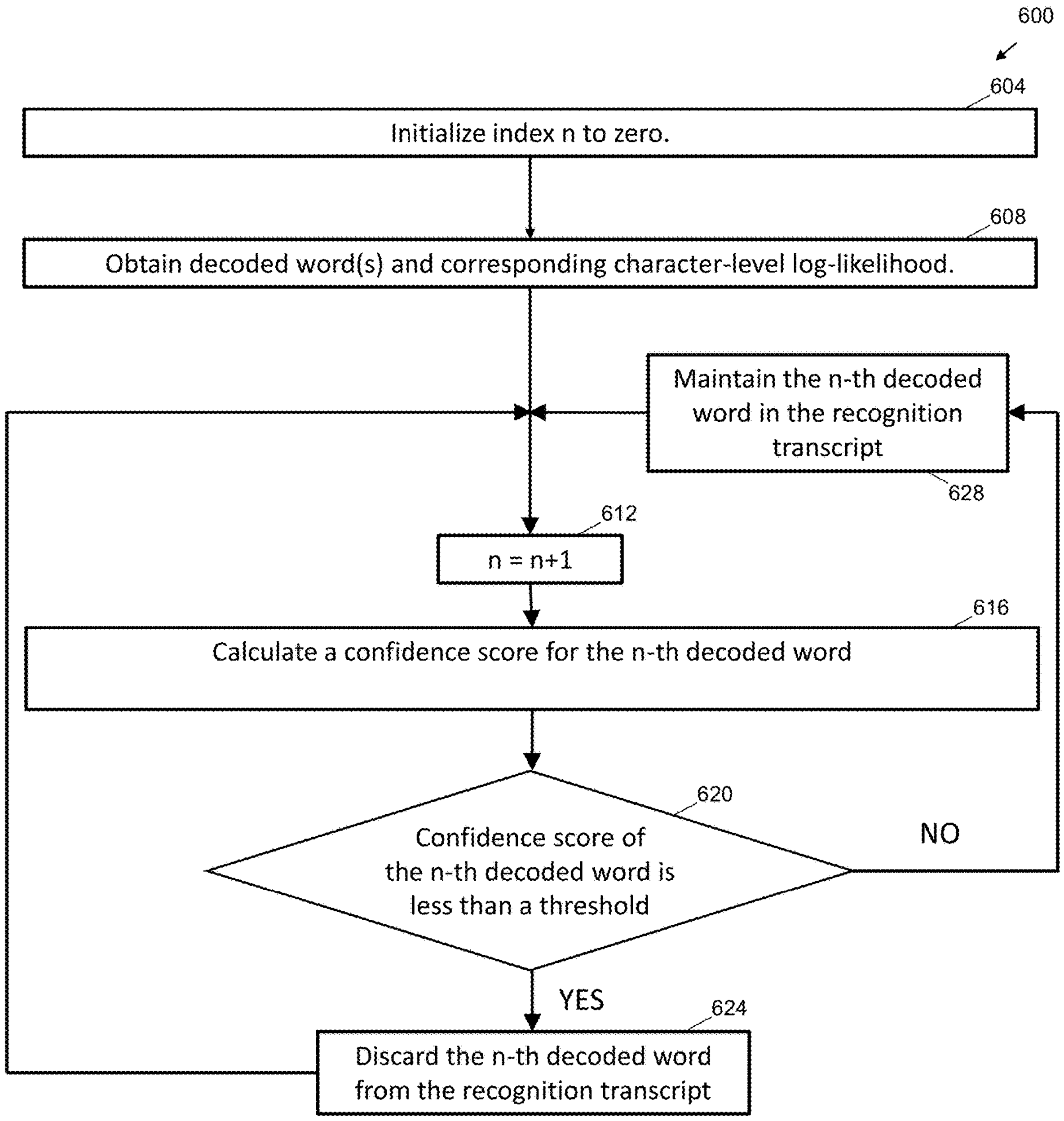
FIG. 6 is a flowchart for an example method for reducing insertion error in an automatic speech recognition system, in accordance with an example embodiment.

FIG. 6 is a flowchart for an example method 600 for reducing insertion error in an automatic speech recognition system, in accordance with an example embodiment. In one example embodiment, an index n is initialized to zero (operation 604) and a decoded word(s) and corresponding character-level log-likelihoods are obtained (operation 608). The index n is incremented (operation 612). A confidence score for the $n^{th}$ decoded word is calculated (operation 616). For example, the confidence score may be calculated by determining an average of character-level log-likelihoods, by determining a weighted average of character-level log-likelihoods, by jointly considering the confidence level of the entire word and the confidence level of the first character, by recombining/merging confidence scores on a letter-by-letter basis, and the like. A check is performed to determine if the confidence score of the $n^{th}$ decoded word is less than a threshold (operation 620). If the confidence score of the $n^{th}$ decoded word is less than the threshold (YES branch of decision block 620), the $n^{th}$ decoded word is discarded from the recognition transcript (operation 624) and the method 600 proceeds with operation 612; otherwise (NO branch of decision block 620), the $n^{th}$ decoded word is maintained in the recognition transcript (operation 628) and the method 600 proceeds with operation 612.

Effectiveness of Example Embodiments on ASR Performance

An RNN-T model trained for a conventional speech-to-text (STT) service with industry-scale mixed dialect data including US English, AU English, GB English, and IN English was used. Experiments were carried out using speech segments automatically generated by an ASR engine trained on more than 10K hours. These generated speech segments included many false alerts (that is, many noise-only segments were mistakenly regarded as speech segments by voice activity detection).

The beam equaled four for all the experiments. Each word error rate (WER) in the table was obtained by an average of 7-8 test sets with some realistic data used for evaluating the STT service. FIG. 4 is a table showing the word error rate for different sets of mixed dialect data using a variety of techniques, in accordance with an example embodiment. Row 1 of the table corresponds to a baseline technique without confidence filtering, row 2 corresponds to word confidence filtering (without the independent space character technique), row 3 corresponds to word confidence filtering (with the independent space character technique), row 4 corresponds to weighted word confidence filtering (with a weight of 1.2 for the trailing space character and 0.8 for other characters), and row 5 corresponds to word confidence combined with first character filtering (without the independent space character technique).

FIGS. 5A-5B are tables showing the word error rate for different sets of mixed dialect data using a variety of thresholds, in accordance with an example embodiment. FIGS. 5A and 5B are tables illustrating the results achieved using different thresholds for the confidence filtering, in accordance with an example embodiment. In the experiments of FIG. 5A, only the last character of each word before the space character is considered for the recombination process during decoding. On the other hand, all the characters are considered for the recombination process in the experiments of FIG. 5B. In every row (except the baseline method) of both FIG. 5A and FIG. 5B, the log-likelihood of the space character (the independent space character technique) is also applied to the confidence filtering. It is noted that experiments #2-#5 in FIG. 4 also use the recombination process based on all of the characters in each word during decoding. Therefore, experiment #3 in FIG. 4 and the experiment labeled "Remove words in conf<0.6" in FIG. 5B indicate the same experiment and the same results. Note for completeness that techniques corresponding to #4 and #5 in FIG. 4 were note sued for the experiments in FIGS. 5A and 5B. In the example embodiment used for the experiments of FIGS. 5A and 5B, confidence filtering is performed as a post-processing step after the decoded results (word sequence) with a log-likelihood score corresponding to each character in each word are obtained.

Given the discussion thus far, it will be appreciated that, in general terms, an exemplary method, according to an aspect of the invention, includes the operations of calculating, using a computerized automatic speech recognition system, a word-level confidence score by computing an average of confidence levels for each character in a word and a trailing space character delineating an end of the word; and managing, using the computerized automatic speech recognition system, the word using a threshold process based on the calculated word-level confidence score.

In one example embodiment, managing the word comprises deleting the word based on the calculated word-level confidence score and a given threshold.

In one example embodiment, the word is deleted in response to the confidence level of the entire word being less than a first threshold $\alpha$ and the confidence level of a first character of the word being greater than a second threshold $\beta$.

Figure 7:
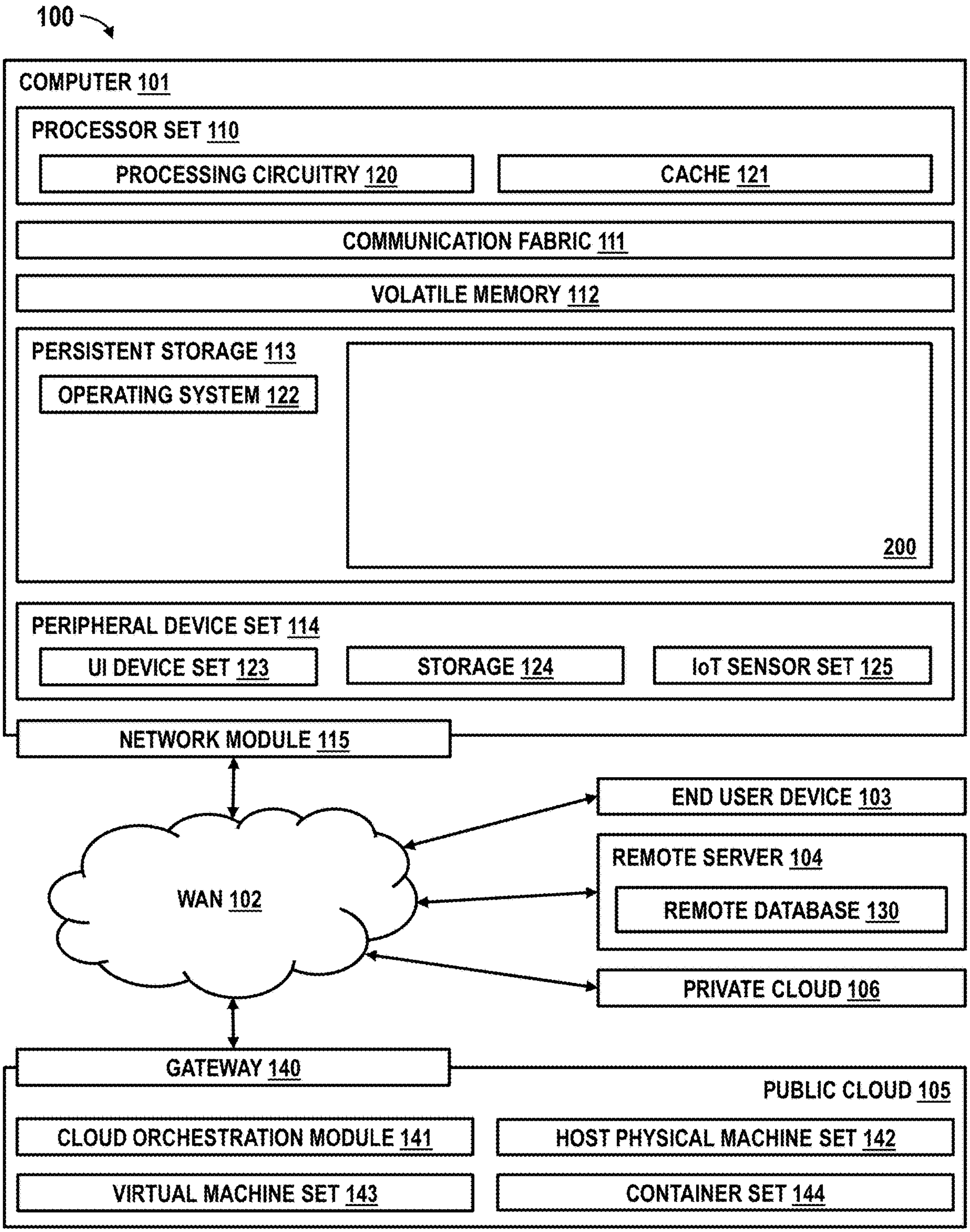
FIG. 7 depicts a computing environment according to an embodiment of the present invention.

It will be appreciated that in one or more embodiments, the operations are applied to the recognition of an input speech signal. For example, an output text corresponding to the recognized speech is generated. The recognized speech will include the non-deleted words and omit the deleted words. In addition to the generation of a text transcript of the speech, the recognized speech can be used for many different applications such as control of a computer (see discussion of FIG. 7) or control of a robot, automobile or other vehicle, machine, appliance, or the like; for example, over WAN 102, a local wired or wireless connection, or the like.

In one example embodiment, a first weight is applied to the confidence level of the trailing space character and a second weight is applied to the confidence level for each character in the word, the application occurring prior to the computing of the average of the confidence levels for each character in the word and the trailing space character.

In one example embodiment, the second weight for each character in the word is assigned independently on a letter-by-letter basis.

In one example embodiment, the confidence level of a first character of the word is separately evaluated and the confidence level of the word is based on the separate evaluation.

In one example embodiment, confidence levels are merged on a letter-by-letter basis from each instance of a same word, a highest confidence level of a letter of a given position is maintained and remaining confidence levels of the letter of the given position are discarded.

In one example embodiment, the confidence level for each character is based on a corresponding log-likelihood.

In one aspect, a non-transitory computer readable medium comprises computer executable instructions which when executed by a computer cause the computer to perform the method of calculating a word-level confidence score by computing an average of confidence levels for each character in a word and a trailing space character delineating an end of the word and managing the word using a threshold process based on the calculated word-level confidence score.

In one aspect, an apparatus comprises a memory and at least one processor, coupled to the memory, and operative to perform operations comprising calculating a word-level confidence score by computing an average of confidence levels for each character in a word and a trailing space character delineating an end of the word and managing the word using a threshold process based on the calculated word-level confidence score.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as computer-implemented speech recognition using insertion error reduction with confidence score-based word filtering 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

calculating, using a computerized automatic speech recognition system, a word-level confidence score by computing an average of confidence levels for each character in a word of an alphabet-based language and a trailing space character delineating an end of the word;

managing, using the computerized automatic speech recognition system, the word using a threshold process based on the calculated word-level confidence score, wherein the managing of the word comprises deleting the word based on the calculated word-level confidence score and a given threshold, and the word is deleted in response to the calculated word-level confidence score of entirety of the word being less than a first threshold $\alpha$ and the confidence level of a first character of the word being greater than a second threshold $\beta$;

performing automatic speech recognition based on a result of the managing of the word; and presenting a result of the automatic speech recognition to a user.

2. The computer-implemented method of claim 1, further comprising applying a first weight to a first confidence level of the trailing space character and a second weight to a second confidence level for each character in the word, wherein the applying of the first weight and the second weight is occurring prior to the computing of the average of the confidence levels for each character in the word and the trailing space character, and wherein the confidence levels include the first confidence level and the second confidence level.

3. The computer-implemented method of claim 1, further comprising assigning a weight for each character in the word independently on a letter-by-letter basis.

4. The computer-implemented method of claim 1, further comprising separately evaluating a first confidence level of a first character of the word and basing a second confidence level of the word on the separate evaluation, wherein the confidence levels include the first confidence level and the second confidence level.

5. The computer-implemented method of claim 1, further comprising merging the confidence levels on a letter-by-letter basis from each instance of a same word, maintaining a highest confidence level of a letter of a given position and discarding remaining confidence levels of the letter of the given position, wherein the confidence levels include the highest confidence level and the remaining confidence levels.

6. The computer-implemented method of claim 1, further comprising basing a confidence level of the confidence levels for each character on a corresponding log-likelihood.

7. A computer program product, comprising:

one or more tangible computer-readable storage media and program instructions stored on at least one of the one or more tangible computer-readable storage media, the program instructions executable by a processor, the program instructions comprising:

calculating a word-level confidence score by computing an average of confidence levels for each character in a word of an alphabet-based language and a trailing space character delineating an end of the word;

managing the word using a threshold process based on the calculated word-level confidence score, wherein the managing of the word comprises deleting the word based on the calculated word-level confidence score and a given threshold, and the word is deleted in response to the calculated word level-confidence score of entirety of the word being less than a first threshold $\alpha$ and the confidence level of a first character of the word being greater than a second threshold $\beta$;

performing automatic speech recognition based on a result of the managing of the word; and presenting a result of the automatic speech recognition to a user.

8. The computer program product of claim 7, wherein the program instructions further comprising applying a first weight to a first confidence level of the trailing space character and a second weight to a second confidence level for each character in the word, wherein the applying of the first weight and the second weight is occurring prior to the computing of the average of the confidence levels for each character in the word and the trailing space character, and wherein the confidence levels include the first confidence level and the second confidence level.

9. A system, comprising:

a memory; and at least one processor, coupled to said memory, and operative to perform operations comprising:

calculating a word-level confidence score by computing an average of confidence levels for each character in a word of an alphabet-based language and a trailing space character delineating an end of the word;

managing the word using a threshold process based on the calculated word-level confidence score, wherein the managing of the word comprises deleting the word based on the calculated word-level confidence score and a given threshold, and the word is deleted in response to the calculated word-level confidence score of entirety of the word being less than a first threshold α and the confidence level of a first character of the word being greater than a second threshold β;

performing automatic speech recognition based on a result of the managing of the word; and presenting a result of the automatic speech recognition to a user.

10. The system of claim 9, the operations further comprising applying a first weight to a first confidence level of the trailing space character and a second weight to a second confidence level for each character in the word, wherein the applying of the first weight and the second weight is occurring prior to the computing of the average of the confidence levels for each character in the word and the trailing space character, and wherein the confidence levels include the first confidence level and the second confidence level.

11. The system of claim 9, the operations further comprising assigning a weight for each character in the word independently on a letter-by-letter basis.

12. The system of claim 9, the operations further comprising separately evaluating a first confidence level of the first character of the word and basing a second confidence level of the word on the separate evaluation, wherein the confidence levels include the first confidence level and the second confidence level.

13. The system of claim 9, the operations further comprising merging the confidence levels on a letter-by-letter basis from each instance of a same word, maintaining a highest confidence level of a letter of a given position and discarding remaining confidence levels of the letter of the given position, wherein the confidence levels include the highest confidence level and the remaining confidence levels.

14. The system of claim 9, the operations further comprising basing a confidence level of the confidence levels for each character on a corresponding log-likelihood.

* * * * *